United States Patent
Wandel

(10) Patent No.: US 7,937,043 B2
(45) Date of Patent: *May 3, 2011

(54) CONTACT MANAGEMENT FOR MOBILE COMMUNICATION DEVICES IN WIRELESS PACKET SWITCHED NETWORKS

(75) Inventor: Matthias Wandel, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 246 days.

This patent is subject to a terminal disclaimer.

(21) Appl. No.: 12/107,395

(22) Filed: Apr. 22, 2008

(65) Prior Publication Data

US 2008/0192667 A1    Aug. 14, 2008

Related U.S. Application Data

(63) Continuation of application No. 11/215,335, filed on Aug. 30, 2005, now Pat. No. 7,373,145, which is a continuation of application No. 10/491,321, filed as application No. PCT/CA02/01472 on Mar. 31, 2004, now Pat. No. 6,999,729.

(60) Provisional application No. 60/325,545, filed on Oct. 1, 2001.

(51) Int. Cl.
    *H04B 1/00*   (2006.01)
(52) U.S. Cl. .................................... 455/69; 370/229
(58) Field of Classification Search .................. None
     See application file for complete search history.

(56) References Cited

U.S. PATENT DOCUMENTS

| | | | |
|---|---|---|---|
| 5,280,541 A | 1/1994 | Marko et al. | |
| 5,454,026 A | 9/1995 | Tanaka | |
| 5,727,002 A | 3/1998 | Miller et al. | |
| 5,748,100 A | 5/1998 | Gutman et al. | |
| 5,970,063 A | 10/1999 | Chapman et al. | |
| 6,223,037 B1 | 4/2001 | Parkkila | |
| 6,275,680 B1 | 8/2001 | Martin et al. | |
| 6,320,852 B1 | 11/2001 | Obuchi et al. | |

(Continued)

FOREIGN PATENT DOCUMENTS

EP   0871340 A2   10/1998
EP   1227639 A2    7/2002

(Continued)

OTHER PUBLICATIONS

Japanese Office Action, Japanese Patent Application #2003533635, Jan. 21, 2009.

(Continued)

*Primary Examiner* — Phuoc Doan
(74) *Attorney, Agent, or Firm* — John J. Oskorep, Esq.

(57) ABSTRACT

Methods and apparatus for efficient communications in a wireless communication network are provided. The wireless communication network has a predetermined network paging pattern which includes a plurality of page transmission periods during which repeated attempts for initiating a communication with a mobile communication device are made until the communication is established, if at all. The mobile device attempts to decode information over a wireless communication channel during each one of the page transmission periods. If the information is unsuccessfully decoded during all of the page transmission periods, the mobile device causes a message which informs the network of the mobile device to be transmitted to the wireless network. On the other hand, if the information is successfully decoded during at least some, but not all, of the page transmission periods, the mobile device refrains from transmitting the message to the wireless network.

25 Claims, 8 Drawing Sheets

U.S. PATENT DOCUMENTS

| | | |
|---|---|---|
| 6,381,455 B1 | 4/2002 | Smolik |
| 6,421,540 B1 * | 7/2002 | Gilhousen et al. ............ 455/458 |
| 6,590,886 B1 * | 7/2003 | Easton et al. ................ 370/342 |
| 6,999,729 B2 | 2/2006 | Wandel |
| 7,046,646 B2 | 5/2006 | Kilgore |
| 2001/0034228 A1 | 10/2001 | Lehtovirta et al. |
| 2002/0082018 A1 | 6/2002 | Coskun et al. |
| 2002/0101880 A1 | 8/2002 | Kim et al. |
| 2002/0159546 A1 | 10/2002 | Fulghum et al. |
| 2004/0058679 A1 | 3/2004 | Dillinger et al. |
| 2004/0148092 A1 | 7/2004 | Kim et al. |
| 2004/0214573 A1 | 10/2004 | Bamburak et al. |
| 2004/0233870 A1 | 11/2004 | Willenger et al. |

FOREIGN PATENT DOCUMENTS

| | | |
|---|---|---|
| WO | 9512931 A1 | 5/1995 |
| WO | 0137473 A1 | 5/2001 |
| WO | 0147142 A1 | 6/2001 |
| WO | 03043258 A1 | 5/2003 |

OTHER PUBLICATIONS

Ayanoglu, Ender; "AIRMAIL: A link-layer protocol for wireless networks": Feb. 1995; pp. 1-33, Baltzer Science Publishers; Amsterdam, NL.

PCT International Preliminary Examamination Report for Application #PCT/CA02/01472, Jan. 7, 2003.

* cited by examiner

A CONTACT MANAGEMENT FOR MOBILE COMMUNICATION DEVICES IN WIRELESS PACKET SWITCHED NETWORKS

CROSS-REFERENCE TO RELATED APPLICATIONS

The present application claims priority to and is a continuation of U.S. non-provisional patent application having application Ser. No. 11/215,335 and filing date of 30 Aug. 2005, now U.S. Pat. No. 7,373,145, which is a continuation of U.S. non-provisional patent application having application Ser. No. 10/491,321 and filing date of 31 Mar. 2004, now U.S. Pat. No. 6,999,729, which is a National Stage filing of PCT application having application number PCT/CA02/01472 and international filing date of 27 Sep. 2002, which claims earlier priority to U.S. provisional patent application having application No. 60/325,545 and filing date of 1 Oct. 2001, each of which are hereby incorporated by reference herein.

BACKGROUND

1. Field of the Technology

The present disclosure relates generally to the field of wireless communications, and in particular to techniques for improving the timeliness in which data packets are delivered to a mobile device over a wireless link in marginal coverage without adding undue amounts of polling across the link.

2. Description of the Related Art

Mobile communication devices, when operating within fringe coverage areas in wireless packet switched networks, may only be able to send and receive packet traffic during sporadic intervals. This causes conventional notions of packet-switched data transactions to break down. Conventional approaches, such as simply retrying transmissions using a back off algorithm, will result in either an intensive use of radio resources (e.g. excessive polling) or poor reliability, especially for communications in a direction from the network to the mobile device. In marginal coverage, data may not be received at the mobile device in a timely fashion as is expected for real-time applications.

DETAILED DESCRIPTION OF PREFERRED EMBODIMENTS

Methods and apparatus for efficient communications in a wireless communication network are described herein. The wireless communication network has a predetermined network paging pattern which includes a plurality of page transmission periods during which repeated attempts for initiating a communication with a mobile communication device are made until the communication is established, if at all. The mobile device attempts to decode information over a wireless communication channel during each one of the page transmission periods. If the information is unsuccessfully decoded during all of the page transmission periods, the mobile device causes a message which informs the network of the mobile device to be transmitted to the wireless network. On the other hand, if the information is successfully decoded during at least some, but not all, of the page transmission periods, the mobile device refrains from transmitting the message to the wireless network.

Figure 1:
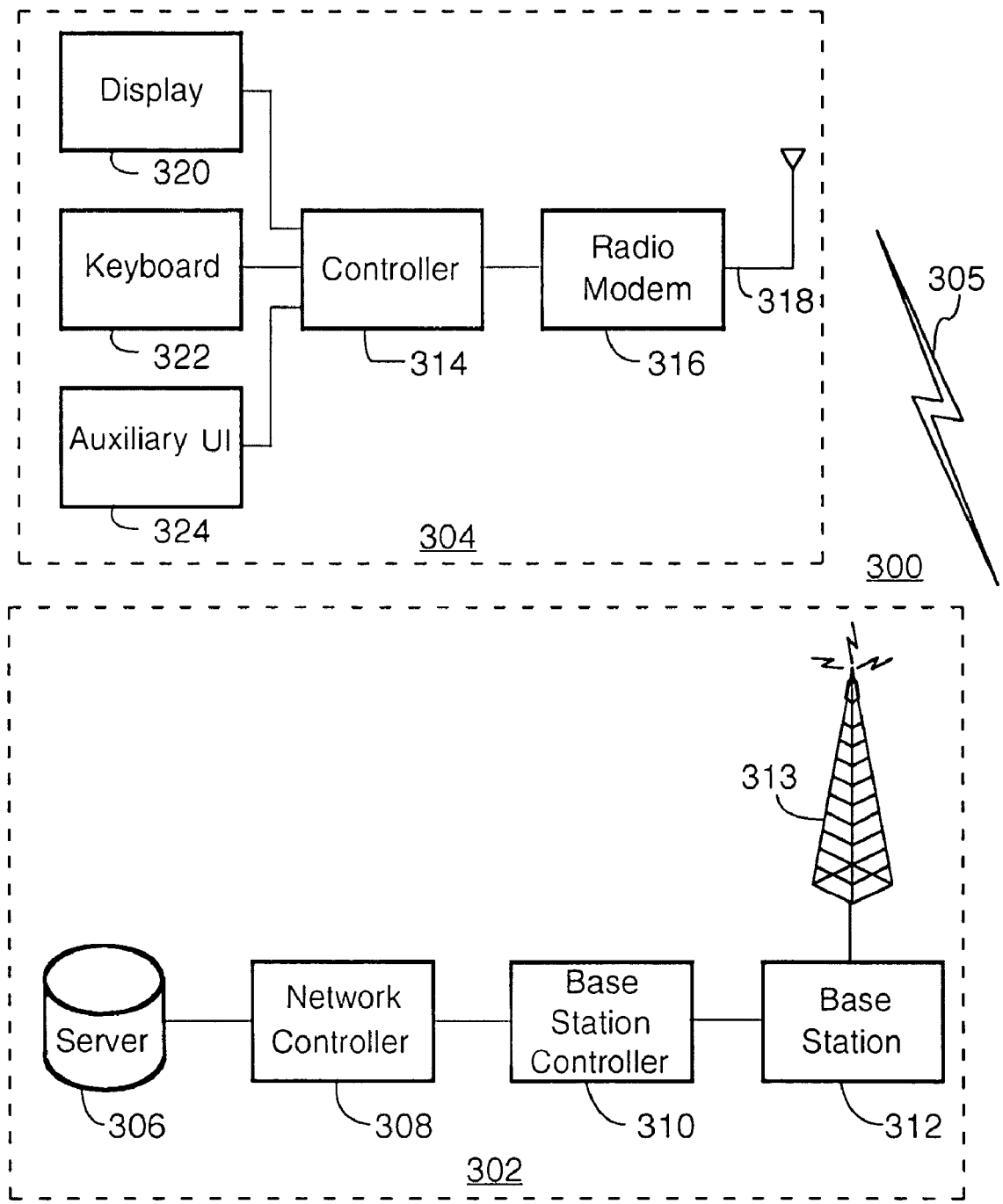
FIG. 1 is a block diagram of a communication system in which the techniques of the instant application may be implemented.

FIG. 1 is a block diagram of a communication system in which the techniques of the instant application may be implemented. The exemplary communication system 300 includes a network 302 and a mobile communication device 304 which communicate over a wireless link 305. Network 302 includes a server 306, a network controller 308, a base station controller 310, a base station 312, and an antenna shown in FIG. 1 to include an antenna tower 313.

Server 306 may be any component or system connected within or to network 302. For example, server 306 may be a service provider system which provides wireless communication services to device 304 and stores data required for routing a communication signal to the mobile device 304. Server 306 may also be a gateway to other networks, including but in no way limited to a telephone network, a local area network, or a wide area network, such as the Internet. Those skilled in the art to which the instant application pertains will appreciate that although only a single server 306 is shown in FIG. 1, a typical communication network may include further additional network storage, processing, routing and gateway components.

Network controller 308 normally handles routing of communication signals through network 302 to a destination mobile communication device (such as mobile device 304). In the context of a packet-switched communication network, such as a General Packet Radio Service (GPRS) based network, network controller 308 must determine a location or address of the destination mobile device and route packets for the mobile device through one or more routers or switches (not shown) and eventually to a base station (such as base station 313) serving a network coverage area in which the mobile device is currently located.

Base station 312 and its associated controller 310 and antenna/tower 313 provide wireless network coverage for a particular coverage area commonly referred to as a "cell". Base station 312 transmits communication signals to and receives communication signals from mobile devices within its cell via antenna 313. Base station 312 normally performs such functions as modulation and possibly encoding and/or encryption of signals to be transmitted to the mobile device in accordance with particular, usually predetermined, communication protocols and parameters, under the control of base station controller 310. Base station 312 similarly demodulates and possibly decodes and decrypts, if necessary, any communication signals received from mobile device 304 within its cell. Communication protocols and parameters may vary between different networks. For example, one network may employ a different modulation scheme and operate at different frequencies than other networks.

Those skilled in the art will appreciate that an actual wireless network, such as a Mobitex™ network or a DataTAC™ network, for example, may include hundreds of cells, each served by a distinct base station controller 310, base station 312 and transceiver, depending upon the desired overall expanse of network coverage. All base station controllers and base stations may be connected by multiple switches and routers (not shown), controlled by multiple network controllers, only one of which is shown in FIG. 1. Similarly, as described above, network 304 may also include a plurality of servers 306, including for example storage, routing, processing and gateway components. Mobitex™ is a registered trademark of Telia AB; and DataTAC™ is a registered trademark of Motorola, Inc.

Thus, the term "network" is used herein to denote the fixed portions of the network, including RF transceivers, amplifiers, base station controllers, network servers, and servers connected to the network. Those skilled in the art will appreciate that a wireless network may be connected to other systems, possibly including other networks, not explicitly shown in FIG. 1. A network will normally be transmitting at the very least some sort of paging and system information on an ongoing basis, even if there is no actual packet data exchanged. Although the network consists of many parts, these parts all work together to result in a certain behaviour at the wireless link. However, which parts of the network are responsible for which particular aspects of the final behaviour over the wireless link is beyond the scope of this application. What is important is the overall behaviour that the components of the network produce, as described in further detail below.

Mobile communication device 304 preferably has a display 320, a keyboard 322, an possibly one or more auxiliary user interfaces (UI) 324, each of which are coupled to a controller 314, which in turn is connected to a modem 316 and an antenna 318. Mobile communication device 304 sends communication signals to and receives communication signals from the network 302 over wireless link 305 via antenna 318. Radio modem 316 performs functions similar to those of base station 312, including for example modulation/demodulation and possibly encoding/decoding and encryption/decryption. It is also contemplated that modem 316 may perform certain functions in addition to those that are performed by base station 312. Where the information in a communication signal or packet is confidential and can be decrypted only at a destination mobile device, for example, base station 312 may not encrypt a received packet which contains information that has been previously encrypted, whereas the radio modem may decrypt such encrypted information. It will be apparent to those skilled in the art that the radio modem will be adapted to the particular wireless network or networks in which the mobile device 304 is intended to operate.

In most modern communication devices, controller 314 will be embodied as a central processing unit or CPU running operating system software which is stored in a mobile device memory component (not shown). Controller 314 will normally control overall operation of the mobile device 304, whereas signal processing operations associated with communication functions are typically performed in the modem 316. Controller 314 interfaces with device display 320 to display received information, stored information, user inputs and the like. A keyboard 322, which may be a telephone type keypad or full alphanumeric keyboard, possibly with auxiliary input components, is normally provided on mobile communication devices for entering data for storage on the mobile device, information for transmission from the mobile device to the network, a telephone number to place a call from the mobile device, commands to be executed on the mobile device, and possibly other or different user inputs.

Thus, the term "mobile device" is used herein in reference to a wireless mobile communication device. The mobile device may consist of a single unit, such as a data communication device, a cellular telephone, a multiple-function communication device with data and voice communication capabilities for example, a personal digital assistant (PDA) enabled for wireless communication, or a computer incorporating an internal modem, but may instead be a multiple-module unit, comprising a plurality of separate components, including but in no way limited to a computer or other device connected to a wireless modem. In the mobile device block diagram of FIG. 1 for example, modem 316 and antenna 318 may be implemented as a radio modem unit that may be inserted into a port on a laptop computer, which would include display 320, keyboard 322, possibly one or more auxiliary UIs 324, and controller 314 embodied as the computer's CPU. It is also contemplated that a computer or other equipment not normally capable of wireless communications may be adapted to connect to and effectively assume control of the radio modem 316 and antenna 318 of a single-unit device such as one of those described above. Although only a single device 304 is shown in FIG. 1, it will be obvious to those skilled in the art to which this application pertains that many devices, including different types of devices, may be active or operable within a wireless communication network at any time.

Having described the components within the system of FIG. 1, its operation will now be discussed in further detail. A mobile device transmitter, within the radio modem 316 in FIG. 1, is typically keyed or turned on only when it is sending to the network, and is otherwise turned off to conserve resources. Such intermittent operation of the transmitter has a dramatic effect on power consumption of mobile device 304. Since mobile device power is normally provided by a limited power source such as a battery, device design and operation must minimize power consumption in order to extend battery life or the time between power source charging operations when a mobile device includes a rechargeable power source.

Wireless link 305 represents one or more different channels, typically different radio frequency (RF) channels, and associated protocols used between network 302 and device 304. An RF channel is a limited resource that must be conserved, typically due to limits in overall bandwidth, as well as mobile device battery power for example, and may employ a variety of modulation and duplexing schemes. Although a network is normally adapted to be continuously or intermittently keyed, even if no traffic is exchanged, a mobile device is typically only keyed when it has traffic to send. Conventional "pull" approaches involving a query from device 304 to network 302 before meaningful information is exchanged between the mobile device and the network, is therefore RF resource intensive and thus unsuitable for many wireless communication applications.

Although no network coverage status resolution scheme can improve actual network coverage, it is possible to improve the timeliness in which traffic is delivered to a mobile device other than by forcing the mobile device to inform the network of its presence relatively often. Broadly, a novel approach for managing network coverage or contact status involves a mobile communication device exploiting particular available information, including predetermined network operation parameters or properties, and/or measured or detected events, to make an informed estimate of the network's view of the mobile device. If the mobile device infers that the network may consider the mobile to be out of coverage, then it may transmit a packet or signal to the network indicating that it is in fact within network coverage. Conversely, if the mobile device is able to infer that the network should not have judged it to be out of range, it may save radio resources by either not indicating its presence to the network or indicating its presence only a small number of times.

Figure 2:
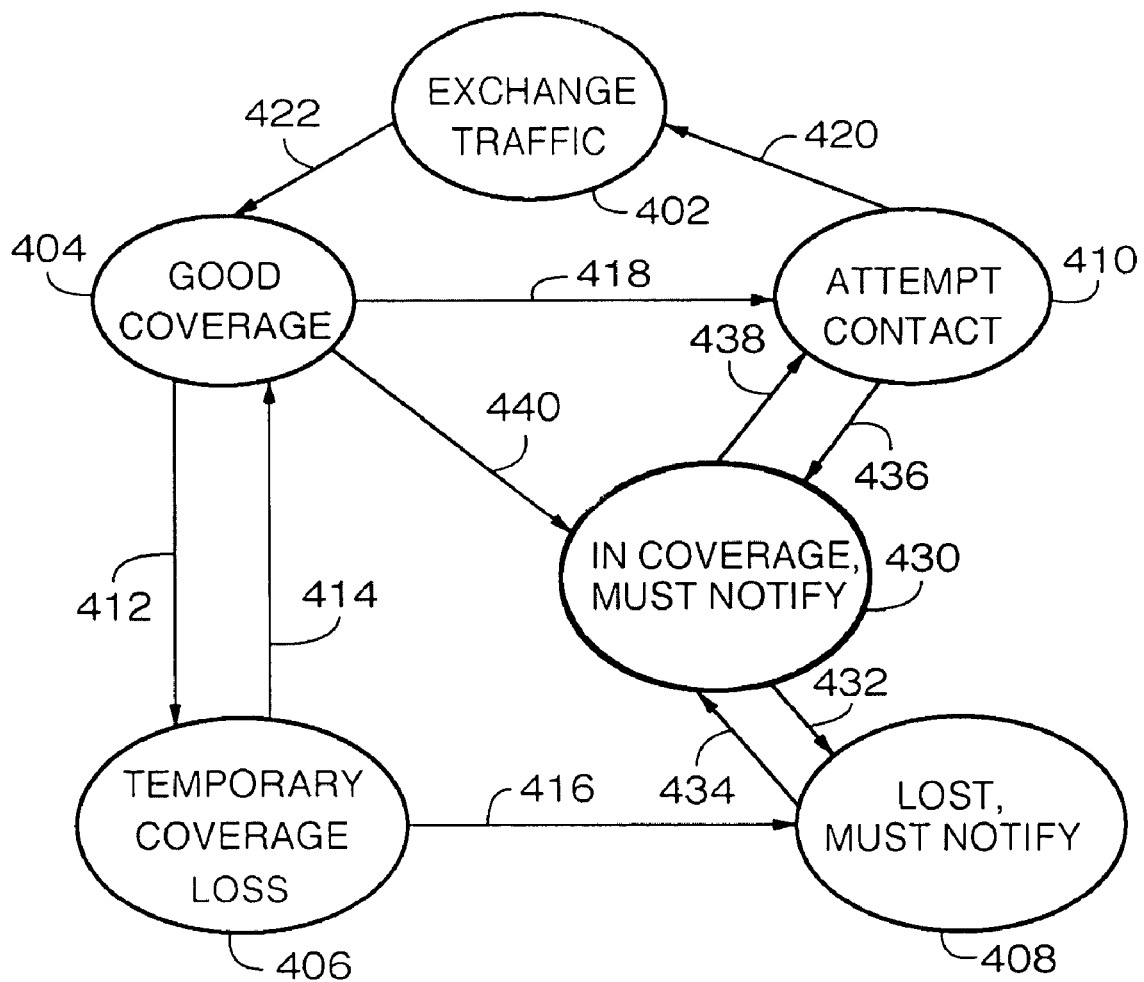
FIG. 2 shows a mobile device state transition diagram in accordance with various aspects of the techniques of the instant application.

FIG. 2 shows a mobile device state transition diagram in accordance with various aspects of the techniques of the instant application. A mobile device can hear a base station in all of the states in FIG. 2 except the "temporary coverage loss" state 406 and the "lost, must notify" state 408. State 404 represents a mobile device being in good coverage, but not actively exchanging data with the network. In the event of a loss of signal on a network paging channel or similar channel monitored by the mobile device, or the strength of such a signal dropping below an RSSI (Received Signal Strength Indicator) threshold, the mobile device will make a transition 412 from the "good coverage state 404 to a "temporary coverage loss" state 406. If the signal is regained or improves after a short period of time, the mobile device may then make a transition 414 back to the "good coverage" state 404. Upon regaining network coverage after a timeout, the mobile device makes a transition 416 to a "lost, must notify" state 408, which is described in further detail below.

In response to a downlink page in the "good coverage" state 404, the mobile device makes a transition 418 to an "attempt contact" state 410 in which the mobile device attempts to send a response to the network. On successful contact with a base station in the network, the mobile device makes a transition 420 to an "exchange traffic" state 402 where the base station sends data to the mobile device. The exchanging of traffic in this state 402 may involve many data packets transferred between the mobile device and the network. After exchanging traffic, the mobile device makes a transition 422 back to the "good coverage" state 404.

The mobile device also has an "in coverage, must notify" state 430. In this state 430, the mobile device is listening to the network. The mobile device knows that it must inform the network of its presence, but is holding off for either some time to expire or signal or coverage to improve. In general, the mobile device spends time in state 430 whenever possible rather than in the "lost, must notify" state 408. Conventional approaches might dictate that the mobile device be out of coverage until the signal is adequate for two-way communications. However, if the signal is good enough for the mobile to "hear" the network, it can be situated in state 430. To comply with the network, it will not attempt to send to the network while in this state.

From the "lost, must notify" state 408, the mobile device will make a transition 434 to the "in coverage, must notify" state 430 on receiving a signal, no matter how weak, but will make a transition 432 back to the "lost, must notify" state 408 upon losing the signal again. The mobile device may also make a transition 436 to the "in coverage, must notify" state 430 from the "attempt contact" state 410 upon failing to contact a base station after receiving a page through a transition 418 (or upon a failure by the network to complete a communication operation), as described in further detail below. In the "in coverage, must notify" state 430, the mobile device makes a transition 438 to the "attempt contact" state 410 and tries contacting the base station again in response to detecting a predetermined condition. The predetermined condition may be an expiration of a timeout period, changes in RSSI, detection of a signal as strong as dictated by a network specification, as well as any other cue that it might be a good time to retry to contact the network, such as user activity or input detected at the mobile device.

In most networks, how often and with what interval the network may broadcast a page message to a mobile device is predetermined. A mobile device may thereby monitor a paging channel or equivalent channel on the wireless link and, on not being paged, be certain that the network has not attempted to contact it. Thus, even in periods where the signal is too poor for successful two-way packet exchange to take place, if the mobile device determines that no packet exchange was attempted by the network during this time, then the network has no notion that coverage was poor in the interim, and will not have given up on contacting the mobile device.

According to this embodiment, the mobile device remains in the "good coverage" state 404 even when coverage is relatively poor, unless no signal can be decoded. That is, signal quality and signal level do not in themselves cause any transition 412. The transition 412 is thus limited to situations in which the mobile fails to decode signals from the network. Therefore, network update signals that would normally be sent from a mobile device when coverage is poor but not lost are avoided. If a page or like signal is detected when the mobile device is in poor coverage, the mobile device will make the transition 418 to the "attempt contact" state 410 and operations continue substantially as described above.

Conversely, if signal strength and quality are good (state 404) and the mobile device detects that the network either pages the mobile device or attempts to send traffic to the mobile device (transition 418 to state 410), but the network does not complete this communication action, the mobile device may infer that the network was unable to decode the mobile device's responses. The mobile device thus knows that the network may have attempted to send it traffic but was not successful, and subsequently makes a transition 436 to the "in coverage, must notify" state 430. When certain time, signal condition, or user activity conditions are satisfied, the mobile device will then make a transition 438 to the "attempt contact" state 410 and re-inform the network of its presence. If contact with the network is established, the mobile device will make a transition 420 to the "exchange traffic" state 402 and the network will re-attempt sending the traffic. Any traffic will thereby be delivered to the mobile device in a delayed, but only moderately delayed, manner. In accordance with this aspect of the disclosure, the mobile device may recognize the problems and can substantially reduce the associated traffic delivery delays.

During periods when the mobile is completely out of touch with the network (state 406), the network may or may not have attempted to reach the mobile device and judged it to be unreachable. If the mobile device is completely out of contact for occasional periods, it is not possible for the mobile device to judge whether or not the network may have attempted to contact it. In packet switched networks, the network may spend a relatively long time period attempting to contact the mobile device before deeming the mobile device to be unreachable. It was observed that a Mobitex network, for example, spent hours attempting to contact a mobile device. In GPRS networks, for example, the time the GPRS components of the network spends retrying is typically much smaller, but servers connected to the GPRS network may make it appear much longer by doing higher level retries at the IP packet level.

If the characteristics that the network uses in attempting to contact a mobile device are known, then this knowledge may be exploited at the mobile device. If a control system or software on the mobile device knows how long and how often the network may attempt to contact a mobile device, even with no response, a judgment can be made as to whether or not the network may have been able to attempt contact and give up, all during the period in which the mobile device was not able to hear the network. As such, if the period of time that the mobile device was out of coverage (state 406) was less than the time it takes for the network to judge the mobile device out of coverage, it is not necessary for the mobile device to indicate to the network that it has re-entered coverage after a period of loss of contact. In accordance with this embodiment, the mobile device preferably remains in the "temporary coverage loss" state 406, and thus may make a transition 414 back to the "good coverage" state 404, for significantly longer durations than known systems allow.

This general concept can be further extended to include spotty coverage, where the mobile device may compare those time segments of successful receipt of a network paging channel against the pattern of paging requests usually seen. If and only if the pattern of paging requests can be fit in such a way that the mobile device may possibly have missed every paging attempt, then the mobile device should indicate to the network that it is back in coverage. The mobile device may therefore make a transition 440 to the "in coverage, must notify" state 430 from the "good coverage" state 404 when all network paging requests may have been missed. To further save power, this can in turn be extended to weigh a risk of missed messages against radio resource usage. The transition 440 might therefore be limited to situations in which a cumulative probability that the mobile device has missed a message is sufficiently high, depending upon the time of day, past traffic patterns, or other criteria, for example.

Several wireless network update schemes have been described above. An illustrative example wireless network and mobile communication device in conjunction with which any of the above schemes may implemented will now be described in detail with reference to FIGS. 3 and 4. However, these examples are intended solely for the purposes of illustration; the network update schemes described herein are in no way restricted to the particular type of networks or devices described below.

Preferred Network. In this application, the expression "IP based wireless network" is intended to include, but is not limited to: (1) the Code Division Multiple Access (CDMA) network that has been developed and operated by Qualcomm; (2) the General Packet Radio Service (GPRS) for use in conjunction with the Global System for Mobile Communications (GSM) network both developed by the standards committee of the European Conference of Postal and Telecommunications Administrations (CEPT); and (3) future third-generation (3G) networks like Enhanced Data rates for GSM Evolution (EDGE) and Universal Mobile Telecommunications System (UMTS). GPRS is a data communications overlay on top of the GSM wireless network. It is to be understood that although an IP based wireless network is shown in FIG. 3, the network update schemes as described in the present application could be utilized with other types of wireless packet data network.

Figure 3:
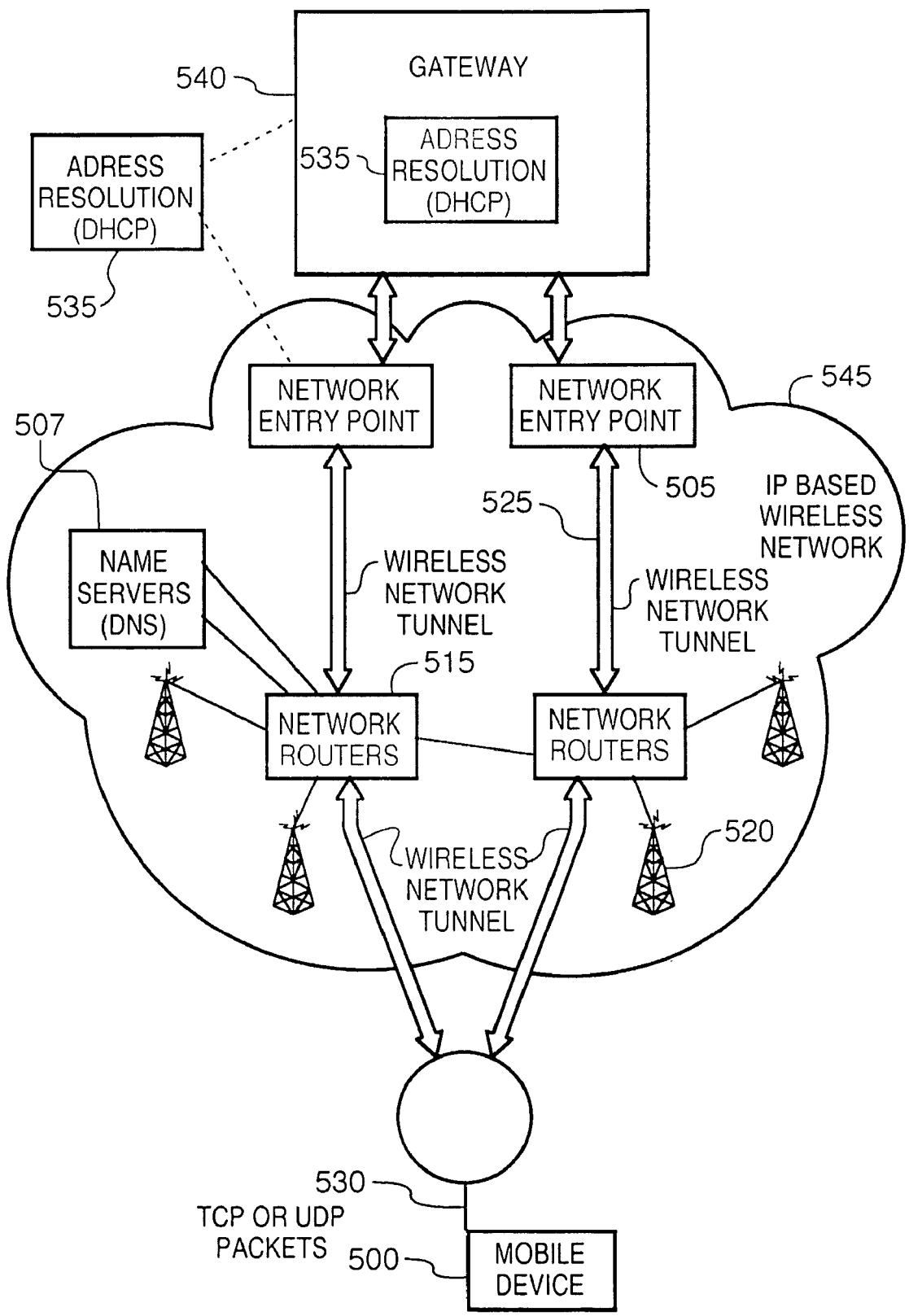
FIG. 3 is a block diagram of a preferred communication system with which a network update scheme according to the instant application may be implemented.

FIG. 3 is a block diagram of a preferred communication system with which a network update scheme according to the instant application may be implemented. FIG. 3 shows the basic components of an IP based wireless data network, such as the GPRS network. The mobile device 500 communicates with a wireless packet data network 545 and may also be capable of communicating with a voice wireless network (not shown), as described in further detail below. The voice network may be associated with the IP based wireless network 545, similar to the GSM and GPRS networks for example, or may be a completely separate network.

The gateway 540, network entry points 505, name server 507 and address resolution components 535 are all specific examples of the server 306 shown in FIG. 1 and described above. Similarly, the network routers 615 in FIG. 3 are examples of a network controller 308 of FIG. 1. Although not explicitly shown in FIG. 3, it will be apparent to those skilled in the art that the base stations generally designated 520 in FIG. 3 include respective base station controllers, and are analogous to the components 310 and 312 of FIG. 1. The GPRS IP based data network is unique in that it is effectively an overlay on the GSM voice network. As such, the GPRS components will either extend existing GSM components, such as the base stations 520, or require additional components to be added, like an advanced gateway GPRS service node (GGSN) as a network entry point 505.

As shown in FIG. 3, the gateway 540 may be coupled to an internal or external address resolution component 535 and one or more network entry points 505. Data packets are transmitted from the gateway 540, which is the source of information to be transmitted to the mobile device 500 in the example system of FIG. 3, through the network 545 to the mobile device 500 by setting up a wireless network tunnel 525 from the gateway 540 to the mobile device 500. In order to create this wireless network tunnel, a unique network address must be associated with the mobile device. In an IP based wireless network however, network addresses are normally not permanently assigned to a particular mobile device 500, but instead are dynamically allocated on an as-needed basis. It is thus necessary for the mobile device to acquire a network address, and for the gateway 540 to determine this address so as to establish the wireless network tunnel 525.

A network entry point 505 is generally used to multiplex and demultiplex between many gateways, corporate servers and bulk connections like the Internet for example. There are normally very few of these network entry points 505, since they are also intended to centralize externally available wireless network services. The network entry points 505 often use some form of address resolution component 535 that assists in address assignment and lookup between gateways 545 and mobile devices 500. In this example, the dynamic lost configuration protocol (DHCP) is shown as one method for providing an address resolution mechanism.

A central internal component of the wireless data network 545 is a network router 515. Normally these network routers 515 are proprietary to the particular network, but they could instead be constructed from standard commercially available hardware. Their purpose is to centralize the thousands of base stations 520 normally implemented in a relatively large network into a central location for a long-haul connection back to the network entry point 505. In some networks there may be multiple tiers of network routers 515, and cases where there are master and slave network routers 515, but in all cases the functions are similar. Often the network router 515 will access a name server 507, in this case shown as a dynamic name server (DNS) 507 as used in the Internet, to look up destinations for routing data messages. The base stations 520, as described above, provide wireless links to the mobile devices 500.

A problem faced by most IP based wireless networks 545 is that the associated wireless equipment tends to be more complex than a traditional (i.e. wireline) IP network, and includes advanced proprietary hardware that does not normally rely exclusively on IP as the communication standard. Other protocols for transferring information over the wireless network 545 may therefore be required. Wireless network tunnels such as 525 are opened across the wireless network 545 in order to allocate the necessary memory, routing and address resources to deliver IP packets.

To open the tunnel 525 for example, the mobile device 500 must use a specific technique associated with the particular wireless network 545. In GPRS, for example, these tunnels 525 are called PDP contexts. The step of opening a tunnel may require the mobile device 500 to indicate the domain, or network entry point 505 with which it wishes to open the tunnel. In this example, the tunnel first reaches the network router 515, and the network router 515 then uses the name server 507 to determine which network entry point 505 matches the domain provided. Multiple tunnels can be opened from one mobile 500 for redundancy or to access different gateways and services on the network. Once the domain name is found, the tunnel is then extended to the network entry point 505 and the necessary resources are allocated at each of the nodes along the way. The network entry point 505 then uses the address resolution (or DHCP 535) component to allocate an IP address for the mobile device 500. When an IP address has been allocated to the mobile device 500 and communicated to the gateway 540, information can then be forwarded from the gateway 540 to the mobile device 500.

The wireless network tunnel 525 typically has a very limited life, depending on the mobile's 500 coverage profile and activity. The wireless network 545 will tear down the tunnel 525 after a certain period of inactivity or out-of-coverage period, in order to recapture the resources held by this tunnel 525 for other users. The main reason for this is to reclaim the IP address temporarily reserved for that mobile device 500 when the tunnel 525 was first opened. Once the IP address is lost and the tunnel is broken down, the gateway 540 then loses all ability to initiate IP data packets to the mobile device, either over Transmission Control Protocol (TCP) or over User Datagram Protocol (UDP). This general characteristic of IP based wireless networks further illustrates the importance of a mobile device 100 being able to determine or reasonably judge its status from the network's view, in accordance with the network update schemes described herein.

Figure 4:
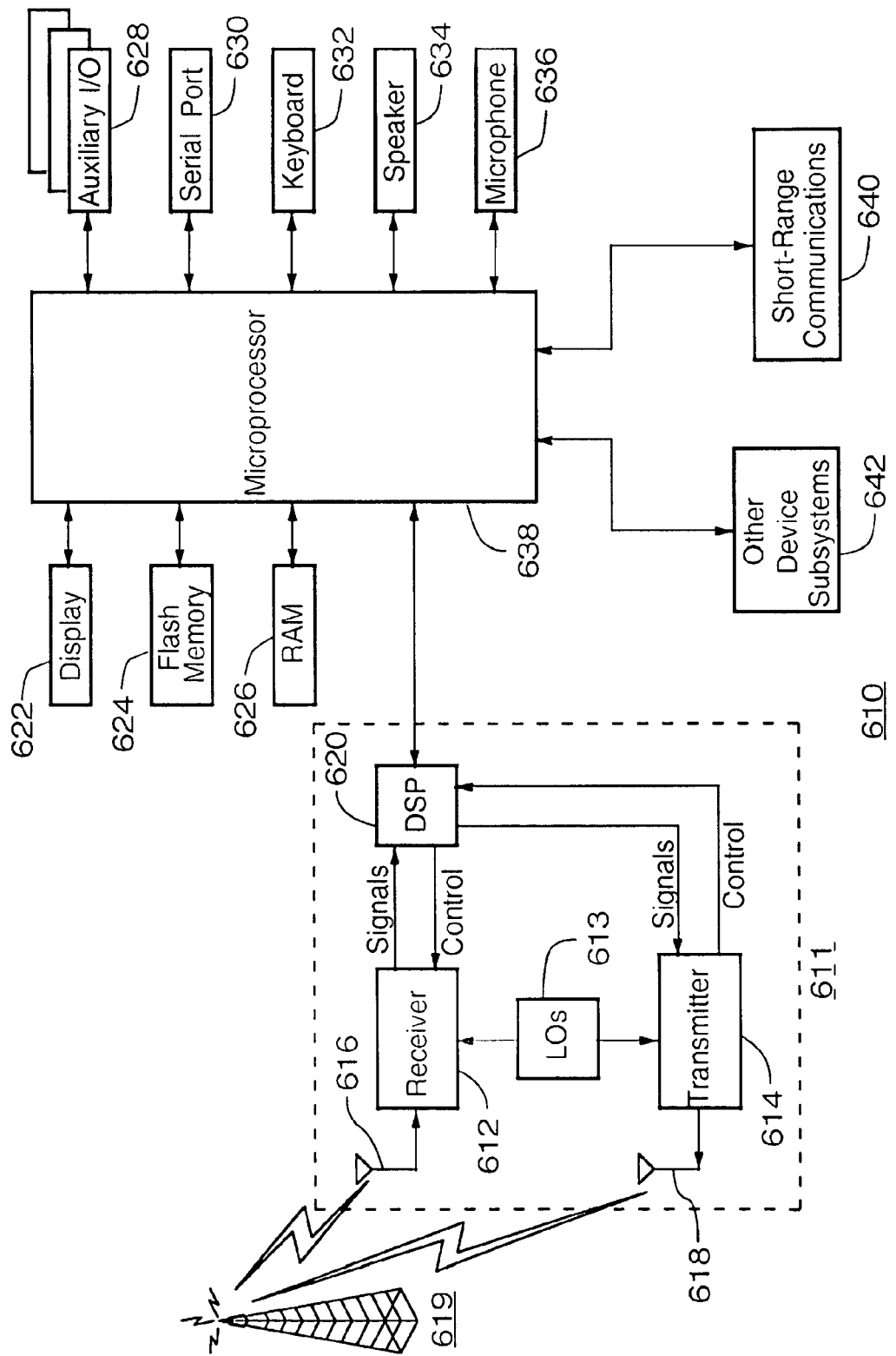
FIG. 4 is a block diagram of a preferred mobile communication device which may be configured to inform a network of its connection status in accordance with a network update scheme described in this application.

Preferred Device. FIG. 4 is a block diagram of a preferred mobile communication device which may be configured to inform a network of its connection status in accordance with a network update scheme described in this application. Mobile communication device 610 may be configured to inform a network of its connection status in accordance with a network update scheme of the present application. The mobile communication device 610 is preferably a two-way communication device having at least voice and data communication capabilities. The mobile device preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance or a data communication device (with or without telephony capabilities).

Where the mobile device 610 is enabled for two-way communications, the mobile device will normally incorporate a communication subsystem 611, including a receiver 612, a transmitter 614, and associated components such as one or more, preferably embedded or internal, antenna elements 616 and 618, local oscillators (LOs) 613, and a processing module such as a digital signal processor (DSP) 620. The communication subsystem 611 is analogous to the radio modem 316 and antenna 318 shown in FIG. 1. As will be apparent to those skilled in the field of communications, the particular design of the communication subsystem 611 will be dependent upon the communication network in which the mobile device is intended to operate. For example, a mobile device 610 may include a communication subsystem 611 designed to operate within a Mobitex mobile communication system, a DataTAC mobile communication system, or a GPRS communication system.

Network access requirements will also vary depending upon the type of network 619 utilized. For example, in the Mobitex and DataTAC networks, such a mobile device 610 is registered on the network using a unique identification number associated with each mobile device. In GPRS networks, however, network access is associated with a subscriber or user of mobile device 610. A GPRS device therefore requires a Subscriber Identity Module (not shown), commonly referred to as a "SIM" card, in order to operate on the GPRS network. Without a SIM card, a GPRS device will not be fully functional. Local or non-network communication functions (if any) may be operable, but mobile device 610 will be unable to carry out any functions involving communications over network 619.

When required network registration or activation procedures have been completed, a mobile device 610 may send and receive communication signals over network 619. Signals received by antenna 616 through network 619 are input to receiver 612, which may perform such common receiver functions as signal amplification, frequency down conversion, filtering, channel selection and the like, and in the example system shown in FIG. 4, analog-to-digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital-to-analog (D/A) conversion, frequency up conversion, filtering, amplification and transmission over the communication network 619 via antenna 618. DSP 620 not only processes communication signals, but also provides for receiver and transmitter control. For example, the gains applied to communication signals in the receiver 612 and transmitter 614 may be adaptively controlled through automatic gain control algorithms implemented in the DSP 620.

Mobile device 610 includes a microprocessor 638, which is one implementation of controller 314 of FIG. 1, which controls the overall operation of the mobile device. Communication functions, including at least data and voice communications, are performed through the communication subsystem 611. Microprocessor 638 also interacts with additional device subsystems such as a display 622, a flash memory 624, a random access memory (RAM) 626, auxiliary input/output (I/O) subsystems 628, a serial port 630, a keyboard 632, a speaker 634, a microphone 636, a short-range communications subsystem 640, and any other device subsystems generally designated as 642.

Some of the subsystems shown in FIG. 4 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile store such as RAM 626. It is contemplated that received communication signals, the detected signal log and the loss of contact log may also be stored to RAM 626.

Microprocessor 638, in addition to its operating system functions, preferably enables execution of software applications on the mobile device. A predetermined set of applications which control basic device operations, including at least data and voice communication applications (such as a network update scheme), will normally be installed on the mobile device 610 during manufacture. A preferred application that may be loaded onto the mobile device may be a personal information manager (PIM) application having the ability to organize and manage data items relating to the mobile device user such as, but not limited to e-mail, calendar events, voice mails, appointments, and task items. Naturally, one or more memory stores would be available on the mobile device to facilitate storage of PIM data items on the mobile device. Such PIM application would preferably have the ability to send and receive data items via the wireless network. In a preferred embodiment, the PIM data items are seamlessly integrated, synchronized and updated, via the wireless network, with the mobile device user's corresponding data items stored or associated with a host computer system thereby creating a mirrored host computer on the mobile device with respect to the data items at least. This would be especially advantageous in the case where the host computer system is the mobile device user's office computer system. Further applications may also be loaded onto mobile device 610 through network 619, an auxiliary I/O subsystem 628, serial port 630, short-range communications subsystem 640 or any other suitable subsystem 642, and installed by a user in the RAM 626 or preferably a non-volatile store (not shown) for execution by microprocessor 638. Such flexibility in application installation increases the functionality of the mobile device and may provide enhanced on-device functions, communication-related functions, or both. For example, secure communication applications may enable electronic commerce functions and other such financial transactions to be performed using mobile device 610.

In a data communication mode, a received signal such as a text message or web page download will be processed by communication subsystem 611 and input to microprocessor 638, which will preferably further process the received signal for output to display 622, or alternatively to an auxiliary I/O device 628. A user of mobile device 610 may also compose data items such as email messages, for example, using the keyboard 632, which is preferably a complete alphanumeric keyboard or telephone-type keypad, in conjunction with display 622 and possibly an auxiliary I/O device 628. Such composed items may then be transmitted over a communication network through communication subsystem 611.

For voice communications, overall operation of mobile device 610 is substantially similar, except that received signals would be output to speaker 634 and signals for transmission would be generated by microphone 636. Alternative voice or audio I/O subsystems, such as a voice message recording subsystem, may also be implemented on mobile device 610. Although voice or audio signal output is preferably accomplished primarily through speaker 634, display 622 may also be used to provide an indication of the identity of a calling party, the duration of a voice call, or other voice call related information, for example.

The serial port 630 in FIG. 4 would normally be implemented in a personal digital assistant (PDA)-type communication device for which synchronization with a user's desktop computer (not shown) may be desirable, but is an optional device component. Such a port 630 would enable a user to set preferences through an external device or software application and would extend the capabilities of the mobile device by providing for information or software downloads to mobile device 610 other than through a wireless communication network. The alternate download path may for example be used to load an encryption key onto the mobile device through a direct and thus reliable and trusted connection to thereby enable secure device communication. Short-range communications subsystem 640 is a further optional component which may provide for communication between the mobile device 624 and different systems or devices, which need not necessarily be similar devices. For example, subsystem 640 may include an infrared device and associated circuits and components or a Bluetooth™ communication module to provide for communication with similarly-enabled systems and devices. Bluetooth™ is a registered trademark of Bluetooth SIG, Inc.

Figure 5:
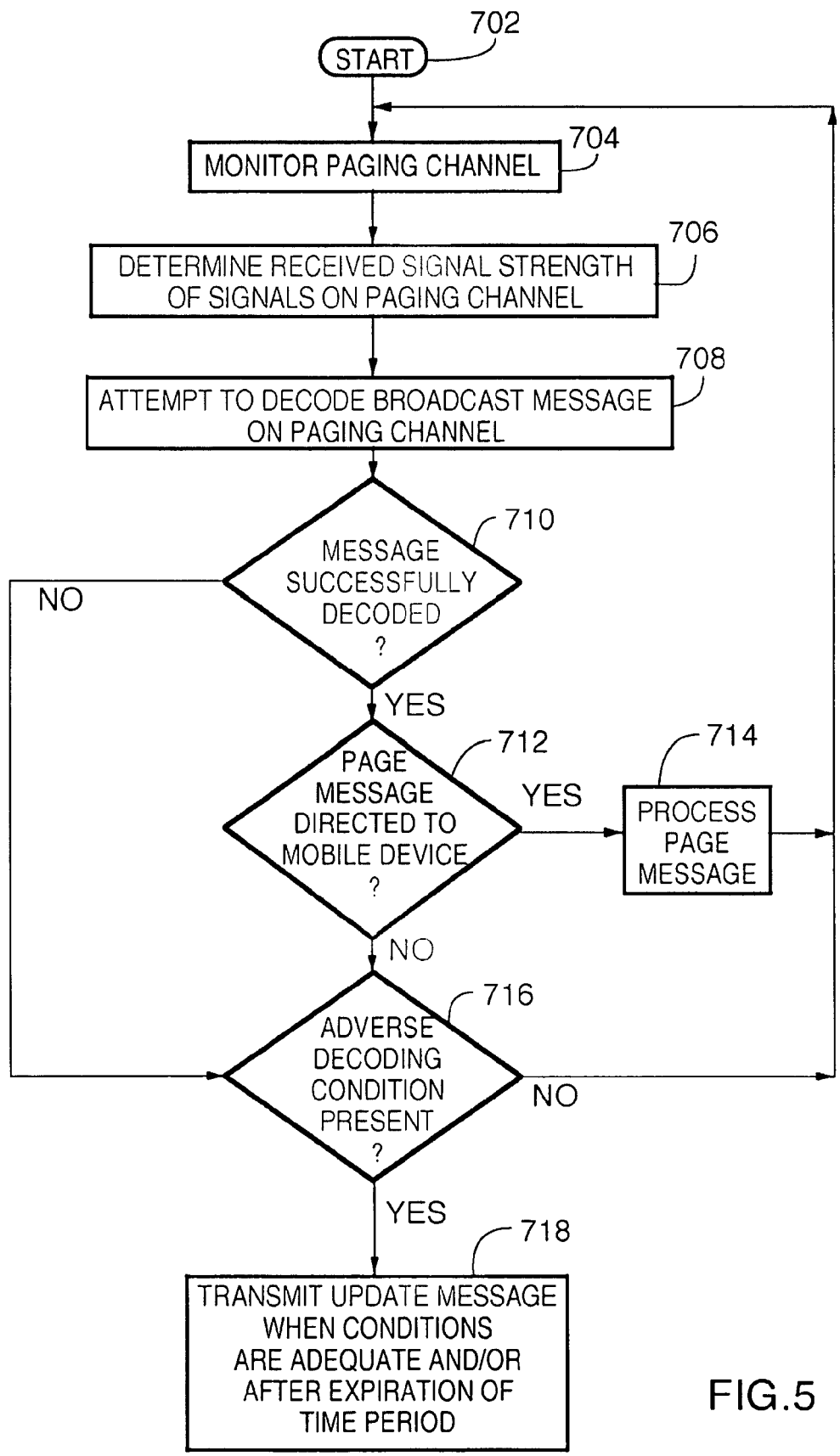
FIG. 5 is a flowchart which describes one method of maintaining contact with a wireless network.

FIG. 5 is a flowchart which describes one method of maintaining contact with a wireless network. The flow chart may involve any of the mobile devices and/or networks described in relation to FIG. 1, 3, or 4. The method of FIG. 5 is a more detailed example of one of the methods previously described in relation to FIG. 2. In this description, the use of the term "receiver" may refer to radio modem 316 of FIG. 1 or receiver 612 of FIG. 4; the term "transmitter" may refer to radio modem 316 of FIG. 1 or transmitter 614 of FIG. 4; and the term "processor" may refer to controller 314 of FIG. 1 or microprocessor 638 or DSP 620 of FIG. 4.

Beginning at a start block 702 of FIG. 5, a mobile device uses its receiver to monitor a paging channel between the mobile device and the wireless network (step 704). Here, the mobile device preferably operates in a discontinuous receive mode where the receiver is controlled to power down and wake up in a periodic fashion to listen to broadcast message signals in a time slot assigned by the network. While receiving signals on the paging channel, the mobile device uses its processor to determine a received signal strength from the signals (step 706) as is conventional. The received signal strength is generally high when the mobile device is in a good coverage area, and generally low when the mobile device is in a poor coverage area.

With conventional methods, if the received signal strength is too low, the mobile device will reject the current network and "scan" the coverage area to identify any better signal that can be provided by different base stations or networks. In the present method, however, the mobile device continues listening to the network with its receiver and attempting to decode a broadcast message on its paging channel (step 708), regardless of the received signal strength. In addition to continuing to listen to the network, the mobile device may also scan the coverage area to identify any better signal from a different network when the received signal strength is low, which is possible in a time-divided communication environment.

Next, the mobile device tests whether the message was successfully decoded (step 710). This step may be performed in the processor using any suitable test, conventional or otherwise, such as by examining an error detection code (e.g. a cyclical redundancy check or CRC), testing for a checksum error, testing whether the decoded message conforms with a predefined message format, etc. The mobile device may store an indication of whether or not the message was actually decoded successfully, preferably in a decode history list which covers a given period of time.

If the message is successfully decoded as identified in step 710, then the mobile device determines whether the message notifies the mobile device of an upcoming data communication session (step 712). This step 712 may be performed in the processor using conventional techniques, such as by comparing a mobile identification code in the message with the mobile device's identification code (or temporary identity code assigned by the network) and, if a match exists, knowing that an upcoming data communication will occur. If the message decoded in step 710 does inform the mobile device of an incoming data communication session in step 712, then the mobile devices processes the message as is conventional (step 714) (i.e. obtains an assigned traffic channel and thereafter receives data over the traffic channel). When all of the data is received, the mobile device may go back to monitoring a paging channel in step 704.

Assuming there was no message directed to the mobile device in step 712, the mobile device identifies whether an inadequate decoding condition is present (step 716). If an inadequate decoding condition is present, as tested at step 716, then the processor will cause the transmitter of the mobile device to transmit an update message which informs the network of the mobile device (step 718). An update message is any message transmitted by a mobile device that is used to inform and/or update the network of the mobile device's status, even if the message may have another different purpose. For, example, the update message may be, in GPRS, a location area update message or a routing area update message. As another example, the update message may be a message for sending user data. On the other hand, if the adverse decoding condition is not present at step 716, the processor will normally refrain from causing the transmitter to transmit the update message. Typically, no update message will be transmitted in this situation even when the signal strength is low, as long as most messages are being successfully decoded. The mobile device may go back to monitoring the paging channel in step 704 to repeat this process.

As apparent, the test in step 716 uses a more intelligent process for transmitting an update message that is different from just testing the received signal strength. The inadequate decoding condition tested in step 716 is determined based on an unsuccessful decoding of one or more regularly broadcasted messages. Preferably, the condition tested for in step 716 is particularly based on a determination that messages corresponding to most or all page transmission periods of a network paging pattern have been unsuccessfully decoded. In this case, the analysis may involve the more detailed process described later in relation to FIGS. 7 and 8(A)-(G).

In a variation to step 718 in FIG. 5, the mobile device transmits the update message only when or until communication conditions are deemed adequate (e.g. the received signal strength is above a predetermined threshold, and/or one or more messages can be decoded, etc.). In another variation, the mobile device delays for a predetermined time period before the transmission of the update message. In yet another variation, the mobile device transmits the update message only when or until communication conditions are adequate after delaying for a predetermined period of time.

As apparent from the method described in relation to FIG. 5, the mobile device maintains contact with the wireless network without overburdening the wireless link with update messages when the received signal strength is low. As described, this method involves monitoring a wireless communication channel, determining a received signal strength of signals on the wireless channel, and attempting to decode a message from the signals. The mobile device normally refrains from transmitting an update message when a message during a page transmission period is successfully decoded, even though the received signal strength may be below a predetermined threshold. In response to an inadequate decoding condition being identified, however, the mobile device transmits an update message which informs the network of the mobile device. The transmission of the update message may be done when communication conditions are deemed adequate, after a predetermined period of time has expired, or both.

Figure 6:
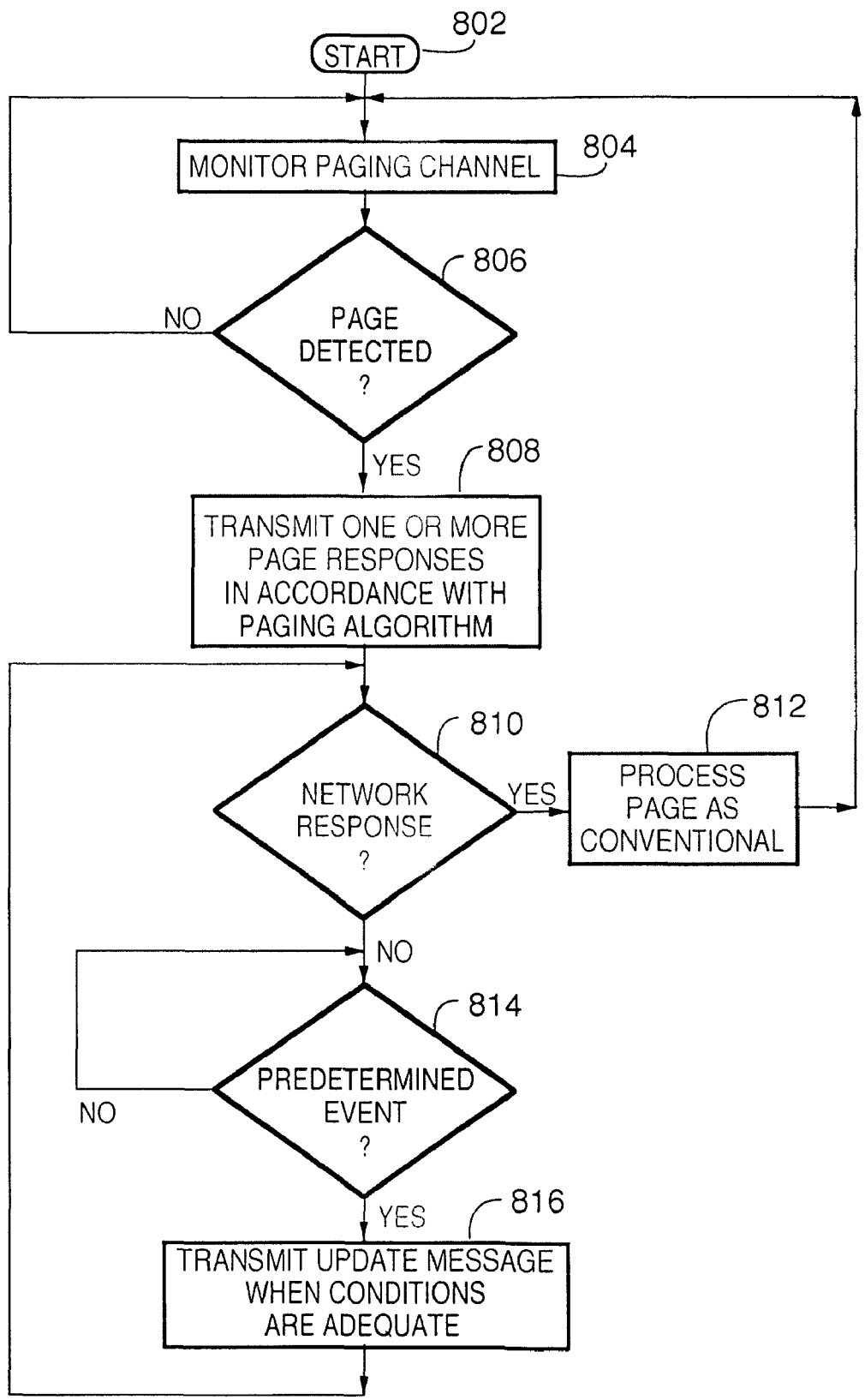
FIG. 6 is a flowchart which describes another method of maintaining contact with a wireless network.

FIG. 6 is a flowchart which describes another method of maintaining contact with a wireless network. The method may involve any of the mobile devices and/or networks described in relation to FIG. 1, 3, or 4. The method of FIG. 6 is a more detailed example of one of the methods previously described in relation to FIG. 2. In this description, the use of the term "receiver" may refer to radio modem 316 of FIG. 1 or receiver 612 of FIG. 4; the term "transmitter" may refer to radio modem 316 of FIG. 1 or transmitter 614 of FIG. 4; and the term "processor" may refer to controller 314 of FIG. 1 or microprocessor 638 or DSP 620 of FIG. 4.

Beginning at a start block 802 of FIG. 6, a mobile device uses its receiver to monitor a paging channel between the mobile device and the wireless network (step 804). Here, the mobile device preferably operates in a discontinuous receive mode where the receiver is controlled to power down and wake up in a periodic fashion to listen to broadcast message signals in a time slot assigned by the network. While monitoring the paging channel, the mobile device receives signals over the channel and attempts to decode a message from the signals. More particularly, the mobile device uses its receiver and processor to test whether it receives and decodes a page message which notifies the mobile device of an upcoming data communication session (step 806). This step may be performed using conventional techniques, such as by using the processor to compare a mobile identification code in the message with the mobile device's identification code and, if a match exists, knowing that an upcoming data communication session will occur for the mobile device.

If the message notifies the mobile device of an incoming data communication session in step 806, then the processor will cause a page response message to be transmitted through the transmitter back to the network (step 808). If no response is received back from the network within a short period of time, however, the processor will cause one or more additional page response messages to be transmitted to the network, in accordance with a conventional or standardized methodology. If a network response is eventually received in step 810, then the mobile device continues processing the message as is conventional (step 812) (i.e. obtains an assigned traffic channel and thereafter receives data over the traffic channel). When all of the data is received, the mobile device may go back to monitoring a paging channel in step 804.

However, if still no response from the network is received after transmitting the page response message(s), as tested at step 810, then the processor in the mobile device causes a delay for some period of time until a predetermined event occurs (step 814). After the predetermined event occurs as tested at step 814, the processor causes an update message which notifies the network of the mobile device to be transmitted through the transmitter (step 816). An update message is any message transmitted by a mobile device that is used to inform and/or update the network of the mobile device's status, even if the message may have another different purpose. For, example, the update message may be, in GPRS, a location area update message or a routing area update message. As another example, the update message may be a message for sending user data.

After transmitting this update message, the mobile device waits again to receive a network response in step 810. If the mobile device receives the network response, it may then proceed to complete processing of the page in step 812. If the mobile device does not receive the network response as tested in step 810, then it continues with the flowchart in step 814 waiting for the predetermined event to occur again as shown.

Alternatively, after transmitting the update message in step 816, instead of waiting for a network response in step 810 the mobile device may revert back to monitoring the paging channel in step 804 for detecting the same (but newly broadcasted) page in step 806. Thereafter, the mobile device again delays until the predetermined event occurs in step 814 to transmit the update message in step 816 and monitor the paging channel for the page.

In one embodiment, the predetermined event detected in step 814 is an expiration of a predetermined time period. In this case, the predetermined time period is preferably between thirty (30) seconds and five (5) minutes. Such a delay is acceptable for communications involving updated user data (as opposed to a voice call), such as an e-mail notification for a newly received e-mail message, an e-mail message, or updated calendar information. Other time periods suitable for these data communications may be chosen as well.

In another embodiment, the predetermined event detected in step 814 is a detection of adequate communication quality. The communication quality may be based on the received signal strength, for example, or whether or not messages can be decoded. If the event is based on received signal strength, then the mobile device waits for the received signal strength to be above a predetermined threshold value, or for it to be above a predetermined threshold for a predetermined period of time. If the event is based on whether or not messages can be decoded, the mobile device detects when a single message received over the channel is successfully decoded. Alternatively, the mobile device detects when a plurality of messages received over the channel are successfully decoded.

In yet another embodiment, the predetermined event detected in step 814 is a detection of user activity at the mobile device. As an example, the mobile device may detect any user input at the mobile device, such as the actuation of a button or touch screen device, before it transmits the update message. As another more particular example, the mobile device may detect that the end user is attempting to access or open an e-mail application (or calendar application) on the mobile device or at tempting to read e-mail information (or calendar information) from the mobile device. One or more of these events may be utilized in combination, and other predetermined events providing a suitable motivation to contact the network may also be utilized.

As apparent from the method described in relation to FIG. 6, the mobile device maintains sufficient contact with the wireless network without overburdening the wireless link with update messages when there is insufficient response from the network. As described, this method generally involves monitoring a wireless communication channel, receiving a message that notifies the mobile communication device of an upcoming data communication session, and transmitting one or more response messages in response to receiving the message. After transmitting the one or more response messages, further communications associated with the message may not be received by the mobile device. In this situation, the mobile device will transmit an update message which informs the network of the mobile device after it detects a predetermined condition. The predetermined condition may involve any suitable motivation to contact the network, for example, an expiration of a predetermined time period, a detection of adequate communication quality, or a detection of user activity at the mobile device.

Figure 7:
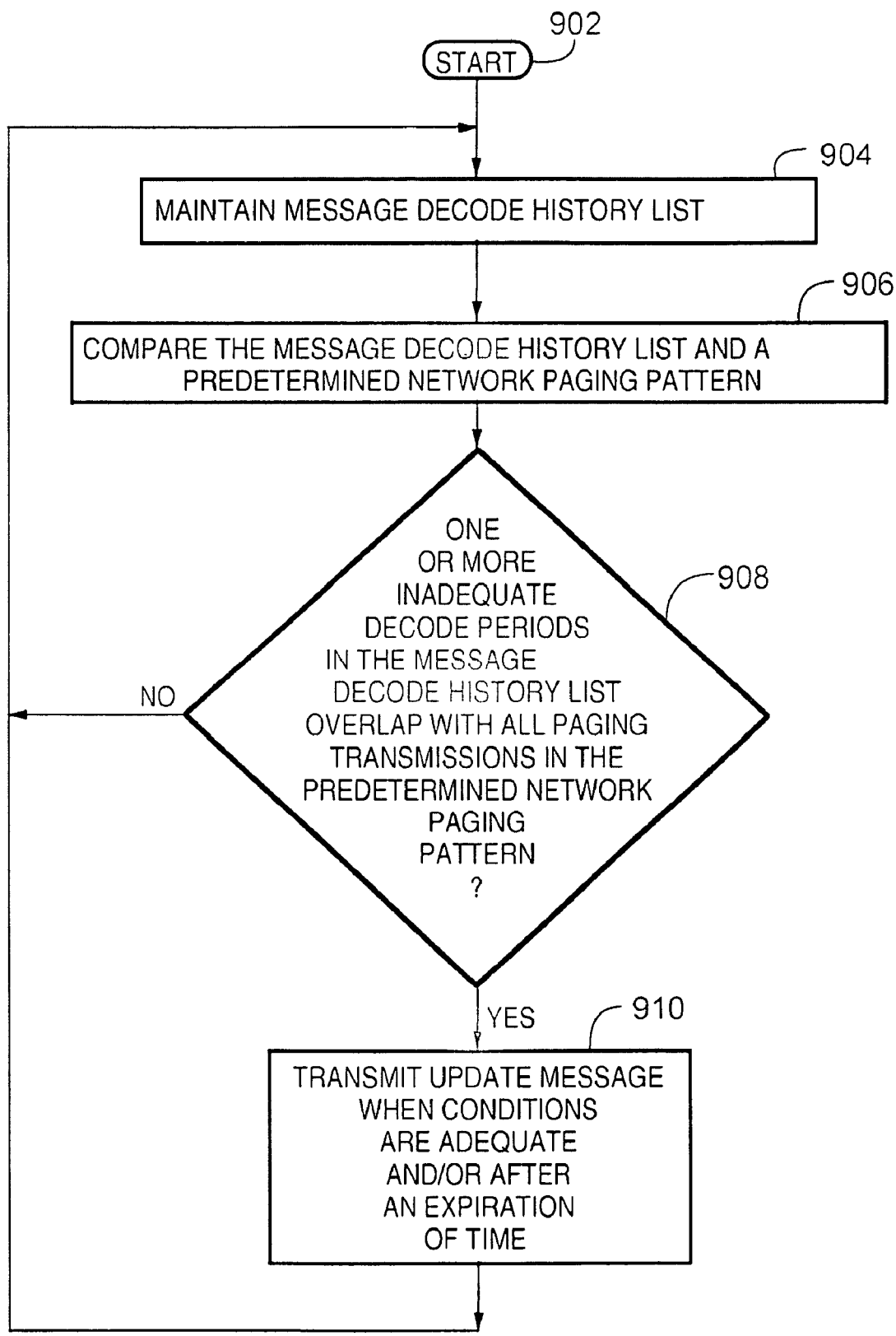
FIG. 7 is a flowchart which describes yet another method of maintaining contact with a wireless network.

FIG. 7 is a flowchart which describes yet another method of maintaining contact with a wireless network. The method may involve any of the mobile devices and/or networks described in relation to FIG. 1, 3, or 4. The method of FIG. 7 is a more detailed example of one of the methods previously described in relation to FIG. 2. In this description, the use of the term "receiver" may refer to radio modem 316 of FIG. 1 or receiver 612 of FIG. 4; the term "transmitter" may refer to radio modem 316 of FIG. 1 or transmitter 614 of FIG. 4; and the term "processor" may refer to controller 314 of FIG. 1 or microprocessor 638 or DSP 620 of FIG. 4. The method of FIG. 7 exploits what is referred to as a "predetermined paging pattern" that is utilized by the network each time a mobile device is paged to receive data. Before describing the flowchart of FIG. 7 in detail, an example of a predetermined network paging pattern is described in relation to a graph shown in FIG. 8(A).

Figure 8:
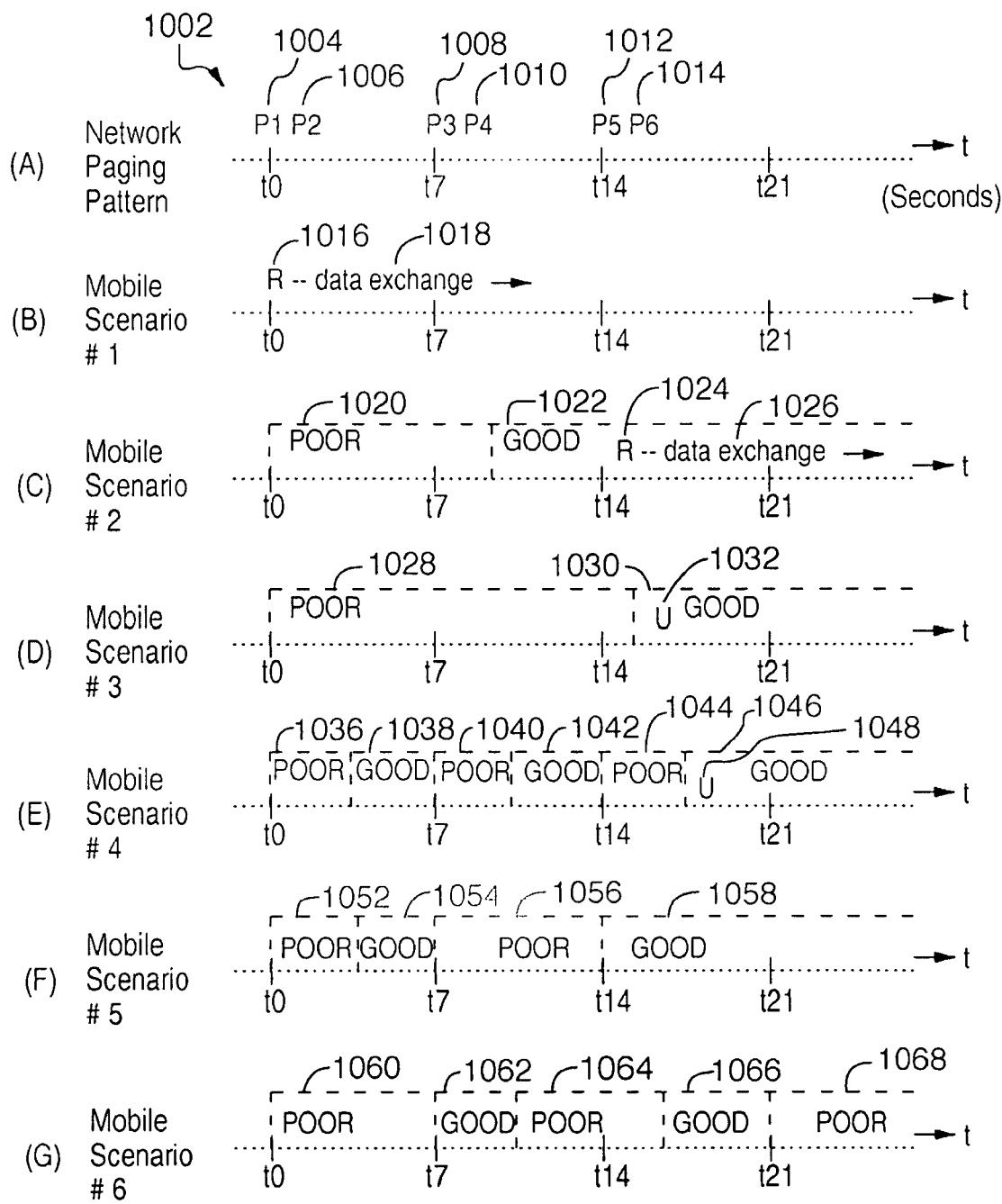
FIGS. 8(A)-(G) are timing diagrams related to the method described in relation to FIG. 7.

The network is configured and prepared to broadcast the same page message to a mobile device more than once in accordance with the paging pattern of FIG. 8(A) as the mobile device may be in a poor coverage area and not be able to receive the page on the first or subsequent tries by the network. In particular, the predetermined network paging pattern of FIG. 8(A) includes a plurality of page broadcast periods 1002 each designed by the letter "P" and a corresponding number. In FIG. 8(A), the specific paging pattern reveals that, each time the network attempts to page a mobile device, it broadcasts a maximum number of six (6) page messages over a fifteen (15) second interval, pairing up each two (2) consecutive page message broadcasts with a 0.5 second interval, with seven (7) second delay periods between each page broadcast pair. More particularly, the first message that the network broadcasts is a page message 1004 (P1) shown at a time $t_0$. About 0.5 seconds later, the network broadcasts another page message 1006 (P2). If the network does not receive a page response from the mobile device shortly after broadcasting page messages 1004 and 1006, it broadcasts another two page messages 1008 and 1010 (P3 and P4) at a time $t_7$ after a delay of about seven (7) seconds. Like page messages 1004 and 1006 (P1 and P2), page messages 1008 and 1010 (P3 and P4) are spaced apart by 0.5 seconds. If the network does not receive a page response from the mobile device shortly after page messages 1008 and 1010, it broadcasts another two page messages 1012 and 1014 (P5 and P6) at a time $t_{14}$ after another delay of about seven (7) seconds. Page messages 1012 and 1014 are also spaced apart by 0.5 seconds.

If the network does not receive a page response from the mobile device shortly after broadcasting page messages 1012 and 1014, the network will altogether stop broadcasting page messages to the mobile device (assuming no further methodology is employed). In this case, the network deems the mobile device "lost" and stops sending it pages. It is desirable to have the network stop broadcasting page messages to the mobile device since it reduces the amount of network traffic over the wireless link; however, this is undesirable when the mobile device regains adequate coverage and is able to receive pages.

FIGS. 8(B) and 8(C) show two examples of conventional response scenarios from a mobile device after receiving a page from the network. To illustrate, in FIG. 8(B) it is shown that the mobile device successfully receives and decodes the first page message broadcasted by the network (namely, page message 1004 or P1 of FIG. 8(A)) and responds by transmitting a page response message 1016. Thereafter, a data exchange 1018 associated with the page takes place between the mobile device and the network. In FIG. 8(C), however, it is shown that the mobile device initially has relatively poor coverage 1020 (e.g. over the first nine (9) seconds or so) and therefore misses the initial page messages broadcasted by the network (namely, it misses page messages 1004 through 1010). However, the mobile device has relatively good coverage after the initial time period and therefore it receives and decodes a subsequent page message (namely, page message 1012 or P5 of FIG. 8(A)). Therefore, the mobile device eventually transmits a page response message 1024 and, thereafter, a data exchange 1026 associated with the page takes place between the mobile device and the network. In the two scenarios of FIGS. 8(A) and 8(B), the system operates as intended and there are no problems encountered.

To employ the novel aspects of the present disclosure, the mobile device has knowledge of the predetermined network paging pattern stored in its memory (e.g. RAM, ROM, or EEPROM). The paging pattern may be stored in the mobile device's memory in any suitable form. For example, the mobile device may have the paging pattern of FIG. 8(A) stored in its memory in binary form as "110000000000001100000000000011" where a binary "1" indicates a broadcasted page message and a binary "0" indicates no broadcasted page message for a given time period. Although FIG. 8(A) shows a very specific example of a paging pattern employed by a network, any suitable paging pattern may be utilized. Preferably, the predetermined network paging pattern covers a relatively short period of time, for example, a predetermined period of time no greater than one (1) minute.

The mobile device utilizes its knowledge of the paging pattern in connection with what is referred to as a "message decode history list" that is maintained in its memory. The message decode history list is a list of message decode indicators, each of which provides an indication of whether or not a previous message was successfully decoded over a relatively short period of time (e.g. 0.5 seconds) when one is expected. Put another way, the message decode history list keeps track of whether or not each of a most recent plurality of regularly broadcasted messages has been successfully decoded. The list of message decode indicators may together cover a relatively long period of time (e.g. the length of the entire predetermined network paging pattern, 15 seconds) from the past to the present.

The message decode history list and its indicators may be represented in any number of different ways. For example, each message decode indicator may indicate either a "MESSAGE SUCCESSFULLY DECODED" ('1") condition or a "MESSAGE NOT SUCCESSFULLY DECODED" ('0') condition for the period of time. In this case, the message decode history list may be represented in binary form, for example, as "111011111111111011111101111111", where each binary number corresponds to a period of 0.5 seconds for a total time period of 15 seconds, the leftmost binary number being the least recent time period and the rightmost number being the most recent time period. Thus, these indicators are preferably stored in temporal order from left to right. In this specific example, the history list shown indicates relatively good decoding over the fifteen (15) second time period within only three (3) short intervals (where the three binary "0" numbers are located) where decoding was poor. As apparent, the message decode history list covers a time period that is equal to or greater than the entire predetermined network paging pattern.

The mobile device generates the message decode history list using its receiver to monitor the paging channel established between the mobile device and the wireless network. While monitoring the paging channel, the mobile device performs various tasks including receiving signals over the channel, determining the received signal strength of the signals, and attempting to decode a message from the signals. The mobile device determines a message decode indicator based on whether or not an expected broadcasted message was decoded over the period of time. More particularly, if the broadcast message was decoded over the period of time, then the message decode indicator is marked as successful ("MESSAGE SUCCESSFULLY DECODED" or "1"); if the broadcast message was unable to be decoded over the period of time, then the message decode indicator is marked as unsuccessful ("MESSAGE NOT SUCCESSFULLY DECODED" or "0"). After determining the current message decode indicator, the mobile device causes it to be stored in the message decode history list as the most recent entry.

Use of the message decode history list and the stored network paging pattern will now be described in relation to the flowchart of FIG. 7. Beginning at a start block 902 of FIG. 7, the mobile device maintains a message decode history list in its memory (step 904). The maintenance of the history list may include using the processor and memory to continually maintain storage of the list and update the message decode indicators to reflect the current time period. The maintenance of the list may also include deleting relatively "old" decode indicators. As one example, if the history list is maintained in binary temporally-ordered form as described earlier, it may be preferable to periodically utilize a "logical shift left" or equivalent operation on the list to simultaneously add the most recent message decode indicator and remove the oldest one.

Next, the mobile device uses its processor to compare the message decode history list with the predetermined network paging pattern stored in its memory (step 906 of FIG. 7). The predetermined network paging pattern may be that described above in relation to FIG. 8(A), for example. In this comparison, the time periods in the list and the pattern are properly aligned to order to identify the overlap between poor/good decode periods and the page transmission/non-transmission periods. The mobile device then uses its processor to test whether one or more unsuccessful message decode periods in the message decode history list overlap with all page transmission periods in the paging pattern (step 908). If this is the case, the mobile device may have missed a page from the network so therefore it transmits an update message which informs the network of the mobile device (step 910), and may repeat the method starting at step 904. An update message is any, message transmitted by a mobile device that is used to inform and/or update the network of the mobile device's status, even if the message may have another different purpose. For, example, the update message may be, in GPRS, a location area update message or a routing area update message. As another example, the update message may be a message for sending user data.

If the one or more unsuccessful message decode periods do not overlap with all page transmission periods in the pattern (i.e. if any successful message decode indicator in the history list overlaps with any page transmission period of the paging pattern) as tested in step 908, the mobile device normally refrains from transmitting an update message to the network. The method may be repeated starting again at step 904.

In an alternative embodiment of FIG. 7, the mobile device transmits the update message only when communication conditions are deemed adequate (e.g. the received signal strength is above a predetermined threshold, and/or one or more messages can be decoded, etc.). In another alternate embodiment, the mobile device delays for a predetermined time period before the transmission of the update message. In yet another alternate embodiment, the mobile device transmits the update message only when communication conditions are adequate after delaying for a predetermined period of time.

If the history list and paging pattern data is maintained in binary form, steps 906 and 908 of FIG. 7 may be performed using a logical "AND" operation between the list and the pattern. For example, a logical AND operation of the paging pattern of "11000000000000110000000000011" and the history list of "11101111111111101111101111111" provides a non-zero result which indicates that at least one successful message decode period co-existed with a potential page message broadcast by the network. A logical AND operation of the same paging pattern "11000000000000110000000000011" and the history list of "00001010100000000000111000000" provides a result of zero which indicates that no successful message decode period co-existed with a potential page message broadcast by the network. In the latter case, the mobile device transmits an update message which informs the network of the mobile device; in the former case, it normally does not. As one skilled in the art will readily understand, other suitable logical operations may be utilized to achieve the same results.

In another alternate embodiment of FIG. 7, the mobile device requires a greater number of successful message decode periods to overlap with page message broadcast periods to refrain from transmitting the update message. That is, more than one successful message decode period is required to overlap with more than one potential page transmission by the network. For example, the mobile device may require that two or three successful message decode periods overlap with two or three potential page message broadcast periods to order to refrain from transmitting the update message. In this case, any number less than two or three will result in the update message being transmitted by the mobile device.

FIGS. 8(D) through 8(G) show various examples of possible responses from a mobile device with use of the methodology described in relation to FIGS. 7 and 8(A). In FIGS. 8(D) through 8(G), the mobile device is operating in relatively poor coverage and the network has not attempted to broadcast any page messages to the mobile device. FIGS. 8(D)-(E) reveal scenarios where the coverage area was indeed poor enough to transmit an update message to the network, whereas FIGS. 8(F)-(G) reveal scenarios where transmission of an update message was not deemed necessary.

More particularly, FIG. 8(D) shows that the mobile device operated in a relatively poor coverage period 1028 over an extended period of time (e.g. over 15 seconds). Thus, all of the message decode indicators in the message decode history list maintained by the mobile device indicated poor coverage over this period 1028 (i.e. list is "000000000000000000000000000000"). In response to the comparison of the history list and the network paging pattern, the mobile station transmits an update message 1032 which informs the network of the mobile device during a relatively good coverage period 1030. The mobile station transmits the update message 1032 even though the network may not have broadcasted any page message during period 1028.

FIG. 8(E) shows that the mobile device operated in a fringe area where both poor and good coverage conditions were encountered. As shown in FIG. 8(E), the mobile device experienced a plurality of poor coverage periods 1036, 1040, and 1044 as well as a plurality of good coverage periods 1038, 1042, and 1046. This caused the mobile device to transmit an update message 1048. The message decode history list may have represented this time period in binary form as "000000111111110000001111111100" in accordance with FIG. 8(E). Performing a logical "AND" operation with this history list and the paging pattern of "11000000000000110000000000011", a result of zero is provided which causes the update message to be transmitted. The mobile station transmits the update message 1048 even though the network may not have broadcasted any page message during the period of marginal coverage.

FIG. 8(F) shows that the mobile device operated in another fringe area where both poor and good coverage conditions were encountered. As shown in FIG. 8(F), the mobile device experienced a plurality of poor coverage periods 1052 and 1056 as well as a plurality of good coverage periods 1054 and 1058. However, the mobile device refrained from transmitting an update message. The message decode history list may have represented this time period in binary form as "00000011111100000000000000011" in accordance with FIG. 8(F). Performing a logical "AND" operation with this history list and the paging pattern of "11000000000000110000000000011", a non-zero result is provided which causes the mobile device to refrain from transmitting an update message.

FIG. 8(G) shows that the mobile device operated in yet another fringe area where both poor and good coverage conditions were encountered. As shown in FIG. 8(G), the mobile device experienced a plurality of poor coverage periods 1052 and 1056 as well as a plurality of good coverage periods 1054 and 1058. However, the mobile device refrained from transmitting an update message. The message decode history list may have represented this time period in binary form as "00000000000011110000000000000" in accordance with FIG. 8(G). Performing a logical "AND" operation with this history list and the paging pattern of "11000000000000110000000000011", a non-zero result is provided which causes the mobile device to refrain from transmitting an update message.

As apparent from the method described in relation to FIGS. 7 and 8(A)-8(G), the mobile device maintains sufficient contact with the wireless network without overburdening the wireless link with update messages when coverage is marginal. As described, this method involves continually maintaining a message decode history list and comparing it with a predetermined paging pattern of the network. An update message which informs the network of the mobile device is transmitted in response to identifying that one or more unsuccessful message decode periods in the message decode history list overlap with all page transmission periods in the predetermined network paging pattern. On the other hand, the update message is not normally transmitted in response to identifying that any successful message decode period in the message decode history list overlaps with any page transmission period in the predetermined network paging pattern. Preferably, the mobile device utilizes a combination of one or more (or all) of the contact management schemes described herein. It will be appreciated that the above description relates to preferred embodiments by way of example only. Many variations on the techniques will be obvious to those knowledgeable in the field, and such obvious variations are within the scope of the invention, whether or not expressly described.

What is claimed is:

1. A method in a mobile communication device for communicating in a wireless communication network, the wireless communication network having a predetermined network paging pattern comprising a plurality of page transmission periods during which repeated attempts for initiating a communication with the mobile communication device are made, the method comprising the acts of:

attempting to decode information over a wireless communication channel during each one of the page transmission periods;

if the information is unsuccessfully decoded during all of the page transmission periods: causing a message which informs the network of the mobile communication device to be transmitted to the wireless communication network; and if the information is successfully decoded during at least some, but not all, of the page transmission periods: refraining from transmitting the message to the wireless communication network.

2. The method of claim 1, further comprising:
continually repeating the recited acts for additional page transmission periods.

3. The method of claim 1, further comprising:
delaying the transmission of the message until communication conditions are adequate.

4. The method of claim 1, wherein the act of refraining from transmitting the message to the wireless communication network is performed if the information is successfully decoded during only one of the page transmission periods.

5. The method of claim 1, further comprising:
If the information is successfully decoded during all of the page transmission periods: refraining from transmitting the message to the wireless communication network.

6. The method of claim 1, further comprising:
maintaining a message history decode list to track, for each page transmission period of the predetermined network paging pattern, whether the information has been successfully decoded; and
determining whether to transmit or refrain from transmitting the message based on the message history decode list.

7. The method of claim 1, further comprising:
continually maintaining and updating a message history decode list to track, for each page transmission period of the predetermined network paging pattern over a current time period, whether the information has been successfully decoded; and
determining whether to transmit or refrain from transmitting the message based on the message history decode list.

8. The method of claim 1, wherein the wireless communication channel comprises a broadcast channel and the information comprises broadcast message information of a broadcasted message.

9. The method of claim 1, wherein the wireless communication channel comprises a broadcast channel over which page messages are broadcasted, and the act of attempting to decode the information comprises page message information.

10. The method of claim 1, further comprising:
decoding information in one of the page transmission periods; and
if the information indicates a communication intended for the mobile communication device: receiving information for the communication.

11. The method of claim 1, further comprising:
powering down a receiver of the mobile communication device during periods other than the page transmission periods.

12. The method of claim 1, which reduces power consumption in the mobile communication device, reduces traffic in the wireless communication network, or both.

13. The method of claim 1, which is embodied in a computer program product comprising a computer readable medium and computer instructions stored in the computer readable medium, wherein the computer instructions are executable by one or more processors in the mobile communication device for performing the method.

14. A mobile communication device operative to communicate in a wireless communication network, the wireless communication network having a predetermined network paging pattern comprising a plurality of page transmission periods during which repeated attempts for initiating a communication with the mobile communication device are made, the mobile communication device comprising:
a receiver;
a transmitter;
an antenna coupled to the receiver and the transmitter;
one or more processors coupled to the receiver and the transmitter;
the one or more processors being operative with the receiver and the transmitter to:
attempt to decode information over a wireless communication channel, via the receiver, during each one of the page transmission periods;
if the information is unsuccessfully decoded during all of the page transmission periods: cause a message which informs the network of the mobile communication device to be transmitted to the wireless communication network via the transmitter; and
if the information is successfully decoded during at least some, but not all, of the page transmission periods: refrain from transmitting the message to the wireless communication network via the transmitter.

15. The mobile communication device of claim 14, wherein the one or more processors are further operative to:
continually repeat the recited actions for additional page transmission periods.

16. The mobile communication device of claim 14, wherein the one or more processors are further operative to:
delay the transmission of the message until communication conditions are adequate.

17. The mobile communication device of claim 14, wherein the one or more processors are further operative to refrain from transmitting the message to the wireless communication network if the information is successfully decoded during at least one of the page transmission periods.

18. The mobile communication device of claim 14, wherein the one or more processors are further operative to:
If the information is successfully decoded during all of the page transmission periods: refrain from transmitting the message to the wireless communication network via the transmitter.

19. The mobile communication device of claim 14, wherein the one or more processors are further operative to:
maintain a message history decode list to track, for each page transmission period of the predetermined network paging pattern, whether the information has been successfully decoded; and
determine whether to transmit or refrain from transmitting the message based on the message history decode list.

20. The mobile communication device of claim 14, wherein the one or more processors are further operative to:
continually maintain and update a message history decode list to track, for each page transmission period of the predetermined network paging pattern over a current time period, whether the information has been successfully decoded; and
determine whether to transmit or refrain from transmitting the message based on the message history decode list.

21. A communication system comprising:

a wireless communication network;

a plurality of mobile communication devices operative in the wireless communication network;

the wireless communication network being operative to initiate a communication with a mobile communication device in accordance with a predetermined network paging pattern, the predetermined network paging pattern comprising a plurality of page transmission periods during which repeated attempts for initiating the communication with the mobile communication device are made;

at least one of the mobile communication devices being operative to:

attempt to decode information over a wireless communication channel during each one of the page transmission periods;

if the information is unsuccessfully decoded during all of the page transmission periods: cause a message which informs the network of the mobile communication device to be transmitted to the wireless communication network; and if the information is successfully decoded during at least some, but not all, of the page transmission periods: refrain from transmitting the message to the wireless communication network.

22. The communication system of claim 21, wherein the mobile communication device is further operative to:

continually repeat the recited actions for additional page transmission periods.

23. The communication system of claim 21, wherein the mobile communication device is further operative to:

delay the transmission of the message until communication conditions are adequate.

24. The communication system of claim 21, wherein the mobile communication device is further operative to:

refrain from transmitting the message to the wireless communication network if the information is successfully decoded during at least one of the page transmission periods.

25. The communication system of claim 21, wherein the mobile communication device is further operative to:

If the information is successfully decoded during all of the page transmission periods: refrain from transmitting the message to the wireless communication network.

* * * * *